UNITED STATES PATENT OFFICE 2,430,212

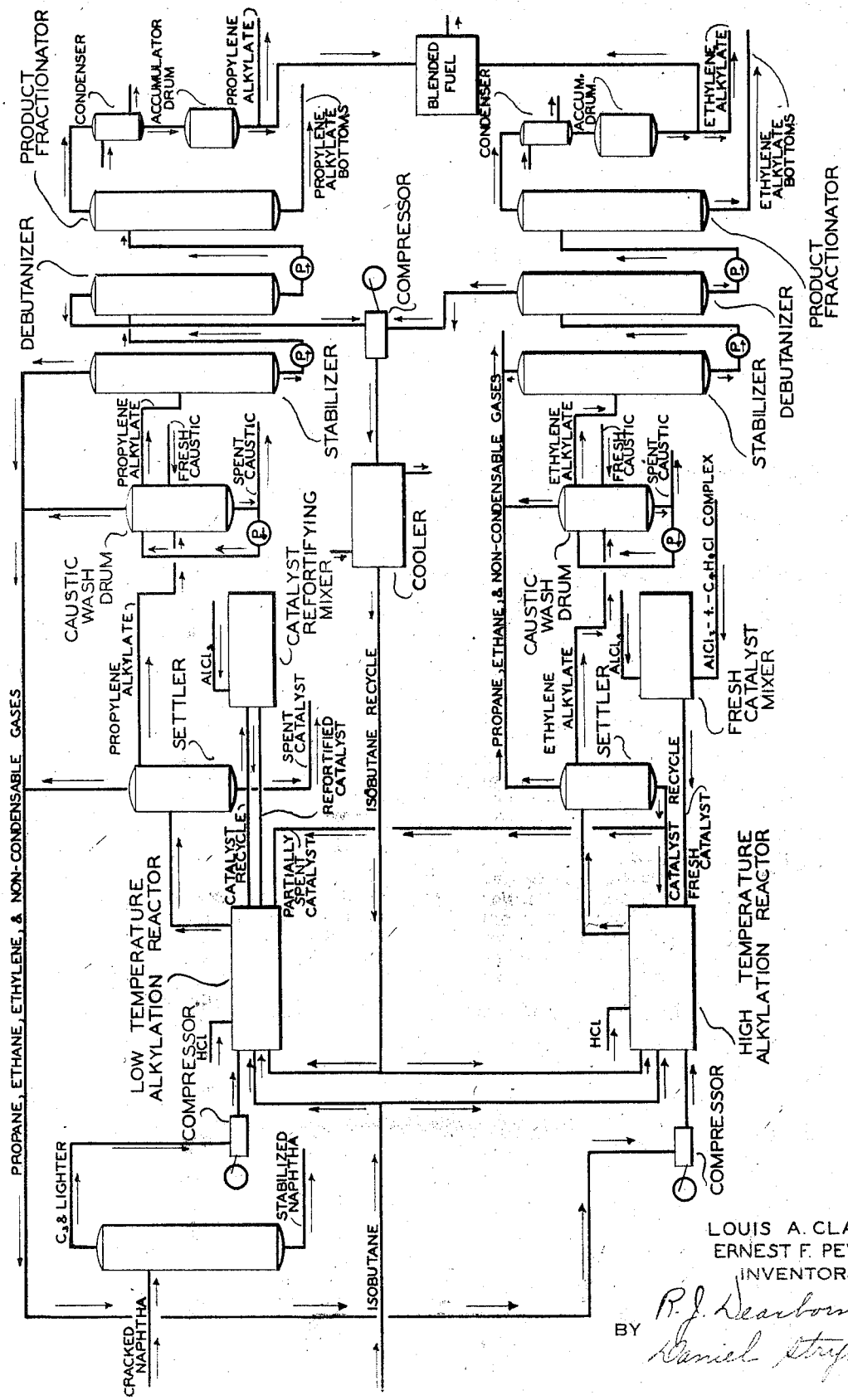

PROCESS FOR THE ALKYLATION OF PARAFFIN HYDROCARBONS

Louis A. Clarke, Fishkill, and Ernest F. Pevere, Beacon, N. Y., assignors to The Texas Company, New York, N. Y., a corporation of Delaware Application December 19, 1942, Serial No. 469,546

8 Claims. (Cl. 260—683.4)

Our invention relates to the alkylation of paraffin hydrocarbons with components of gas mixtures containing olefins of two and more carbon atoms. More specifically, our invention relates to a process for the selective alkylation of isoparaffins by means of olefins of more than two carbon atoms, utilizing gas mixtures containing ethylene in addition to such higher molecular weight olefins.

In view of the practical difficulties of separating ethylene from propylene and other low molecular weight olefins in gas mixtures such as refinery cracked gases, attempts have been made to utilize such mixtures for alkylation without prior separation. Since aluminum halide catalysts are suitable for the alkylation of paraffins with ethylene, catalysts of this type have generally been employed when attempting to use mixed olefins as the alkylating agents. However, at the high temperatures required for ethylene alkylation, the higher molecular weight olefins in the mixture have been found to undergo adverse reactions, and the catalyst life is unduly short. When attempting to operate at lower temperatures on the other hand, the catalyst must be highly activated, for example by the incorporation of a relatively large amount of a hydrogen halide in the reaction mixture, in order to obtain substantial ethylene alkylation. This results in the same adverse effect obtained with less active catalysts at higher temperatures, and up to the present time no satisfactory method has been devised for the utilization of gas mixtures containing both ethylene and propylene for the alkylation of paraffin hydrocarbons.

An object of the present invention is to provide a process for the selective alkylation of isoparaffins by means of olefins of more than two carbon atoms contained in gas mixtures comprising ethylene and such higher molecular weight olefins.

Another object of our invention is to provide an improved process for the utilization of both an ethylene component and a higher molecular weight olefinic component of a gas mixture for the alkylation of paraffin hydrocarbons.

A further object of our invention is to provide improved catalyst life in a process for the utilization of both ethylene and propylene components of gas mixtures for the alkylation of isoparaffins in the presence of aluminum halide catalysts.

Other objects and advantages of our invention will be apparent from the following description:

In accordance with our present process, gas mixtures containing ethylene and higher molecular weight olefins are utilized for the alkylation of isoparaffins under conditions which provide selective alkylation by means of the olefins of more than two carbon atoms. To effect this end, we employ an aluminum halide catalyst at low temperatures, and maintain the concentration of any hydrogen halide activators in the reaction mixture sufficiently low to prevent adverse effects on product quality and catalyst life. Under these conditions, isoparaffins may be selectively alkylated by the olefins of more than two carbon atoms, leaving the ethylene of the charge mixture substantially unreacted.

Any of the known types of aluminum halide alkylation catalysts may be utilized for our selective alkylation. For example, a solid aluminum halide, such as aluminum chloride, may be used alone, or the aluminum halide may be supported on kieselguhr, alumina, or similar supporting media commonly used for this purpose. The various liquid complexes of aluminum halides with hydrocarbons or other organic compounds are suitable catalysts for our process, but we prefer to use a combination of such a complex and free aluminum halide. Solutions or suspensions of aluminum chloride in a complex of aluminum chloride and tertiary butyl chloride, or complexes of aluminum chloride and high boiling petroleum hydrocarbons such as kerosene fractions, are very satisfactory for this purpose. Suitable catalysts of this type are described in co-pending applications, Serial Nos. 327,575 and 439,299 of Louis A. Clarke, filed April 3, 1940, and April 17, 1942 respectively.

Satisfactory liquid complexes for use in our preferred catalysts may be obtained by heating aluminum chloride with kerosene, or other high boiling petroleum fractions such as high boiling naphthas or gas oils. Aluminum chloride-hydrocarbon complexes comprising spent aluminum chloride catalysts from other processes such as conventional alkylation or isomerization operations, may also be employed. Liquid complexes of aluminum chloride with other types of organic compounds may also be used, and our preferred complexes are prepared by heating aluminum chloride with tertiary butyl chloride and separating the supernatant liquid product.

When employing any of the liquid complexes of the above types, additional aluminum chloride is incorporated in the complex in the form of a solution or suspension; and, for continuous operation in our alkylation process, the activity of the catalyst is maintained by continuous or intermittent incorporation of additional aluminum chloride. The amount of free aluminum chloride maintained in the complex may vary within relatively wide limits. It is only necessary to have sufficient dissolved or suspended aluminum chloride distributed throughout the body of the complex to provide effective contact between the free aluminum chloride and the reacting hydrocarbons. Concentrations of free aluminum chloride in the liquid complex ranging from 10 to 50% of the weight of the complex will usually be satisfactory, and we prefer to employ an amount of about 25% of the weight of the complex.

Catalysts comprising aluminum chloride suspended in a liquid aluminum chloride complex, or aluminum halide catalysts of any of the other types may be employed in our process without additional activation, but it is usually desirable to employ a minor amount of a hydrogen halide to activate the catalyst. It is necessary, however, to maintain the concentration of hydrogen halide in the reaction mixture below a concentration which will result in adverse reactions, such as decomposition of the primary reaction products, or which will result in decreased catalyst life. The amount of hydrogen halide in the reaction mixture should be less than 0.1% by weight, based on the weight of aluminum halide in the reaction zone. In continuous operation, it is desirable to incorporate the hydrogen halide in the hydrocarbon charge mixture, and the amount that is introduced should not be substantially more than one part per hour, per 100 parts of aluminum halide in the reaction zone. Amounts ranging from 0.1 to 1.0 part per hour per 100 parts of aluminum halide are generally satisfactory.

The alkylation may be effected in any suitable type of reaction vessel which provides intimate contact of the hydrocarbon charge mixture with the aluminum halide catalyst. When employing our preferred liquid suspension catalysts, the reaction may be effected by bubbling the hydrocarbon charge through a column of the liquid suspension, or by thoroughly mixing the charge and catalyst in a vessel equipped with suitable agitating means. Alternatively, the agitation may be provided by circulating pumps. Generally, any type of apparatus which has been employed in other alkylations may be utilized in our present process. However, in view of the low temperatures required for our selective alkylation, and the fact that the alkylation reaction is exothermic in nature, it will usually be necessary to provide cooling means for controlling the temperature. Internal coils or external jackets on the apparatus, through which a cooling medium is recycled, will be satisfactory for this purpose.

The temperature employed for our selective alkylation should be maintained below 70° F., and a suitable range comprises 30–70° F. Temperatures below 30° F. may be used if desired, but increased viscosity of the reaction mixture and decreased reaction velocity at the lower temperatures usually make it undesirable to operate outside the range 30–70° F. Generally, we prefer to employ a temperature of 40–60° F.

In view of the high vapor pressures of gas mixtures containing substantial amounts of ethylene, propylene, or other low molecular weight hydrocarbons, it will be necessary to effect the alkylation reaction under super-atmospheric pressure, if it is desired to effect the reaction in the liquid phase. The pressure is not critical, however, and any pressure may be used which will provide a liquid hydrocarbon phase in the reaction vessel. Pressures of 100 to 400 pounds per square inch will generally be satisfactory.

The contact time for the selective alkylation process may vary over a considerable range, e. g., from a fraction of a minute to 30 minutes or more. It will usually be desirable to employ a contact time no longer than necessary to secure complete reaction of the olefins of more than two carbon atoms, in order to minimize the reaction of ethylene in this stage of the process. In most cases, contact times of 5 to 15 minutes should be satisfactory. If the reaction pressure is not sufficiently high to maintain all of the hydrocarbons in the liquid phase, it may be difficult to determine accurately the contact time for the reaction. In such cases, it will usually be sufficient to determine the rate of hydrocarbon feed on the basis of space velocity, expressed as volumes of hydrocarbon charge, calculated as volumes in the liquid phase, per volume of catalyst per hour. The space velocity, calculated in this manner and referred to herein as "space velocity, liquid basis," should usually be within the range of 1 to 15, and preferably 5 to 10.

The other conditions for our selective alkylation may be determined in accordance with prior practice for conventional alkylation processes. The ratio of isoparaffin to olefin in the hydrocarbon charge should be substantially greater than 1 mol of isoparaffin per mol of total olefins, and preferably a molar ratio of at least 4 to 1. A high concentration of isoparaffin in the reaction mixture should be maintained, as well as maintaining molar excess in the hydrocarbon charge. Various expedients to effect these ends, such as multiple stage alkylation with split olefin feed, emulsion recycle and high isoparaffin recycle ratios may be employed. Generally, any condition which is known to be favorable in conventional alkylation processes, will also be desirable in our low temperature selective alkylation.

Our selective alkylation process is applicable to the utilization of all types of hydrocarbon mixtures containing substantial amounts of ethylene and higher molecular weight normally gaseous olefins. Mixtures of substantially pure olefins may be used; and with such mixtures, it is possible to secure substantially pure ethylene as the residual gaseous product. Generally, however, our process will be of most value in the treatment of the usual types of olefinic refinery gas mixtures, such as cracked gases. In such cases, the residual gaseous product will comprise ethylene, saturated hydrocarbons, and noncondensable gases. The ethylene may be separated from such residual gases much more readily than from the original mixture containing propylene, or propylene and other higher molecular weight olefins.

The residual gas from our selective alkylation may be used to supply ethylene for any of its various uses in the art, but we prefer to utilize the ethylene content of the residual gases for further alkylation of paraffin hydrocarbons. For this purpose, any of the alkylation catalysts which are known to effect ethylene alkylation may be employed, but aluminum halide catalysts are preferred, and especially the aluminum chloride complex type of catalyst previously referred to. With catalysts of the latter type, the alkylation may be effected in accordance with the procedure employed for the selective alkylation, except for the use of higher temperatures. For the ethylene alkylation, temperatures of 90–130° F. will generally be satisfactory, but we prefer to use a temperature of about 110–115° F. Suitable reaction conditions for the ethylene alkylation of isoparaffins with aluminum chloride catalysts are described in co-pending applications Serial Nos. 327,575 and 439,299 of Louis A. Clarke filed April 3, 1940, and April 17, 1942, respectively.

In the absence of other olefins, ethylene alkylation may be effected under much more drastic conditions than employed in our selective alkylation, and under such conditions, the ethylene may be utilized for the alkylation or isomerization-alkylation of normal paraffins. However, a desirable combination process comprises the selective alkylation of an isoparaffin by the olefins of more than two carbon atoms, followed by the alkylation of the same isoparaffin with the residual ethylene. This combined alkylation process, as applied to the alkylation of isobutane by means of ethylene and propylene, produces high yields of motor fuel hydrocarbons of exceptionally good anti-knock characteristics, and the resulting alkylates may be blended together to form an improved motor fuel.

When employing the same catalyst for the selective alkylation and for the alkylation by means of the residual ethylene, a number of different procedures may be employed. For batch operation, it is only necessary to raise the temperature of the reaction mixture at the conclusion of the low temperature alkylation reaction. For continuous operation the reaction mixture may suitably flow from the low temperature reactor through a heater to a high temperature reactor. In this manner the catalyst need be separated only at the conclusion of the high temperature alkylation, and may then be refortified and recycled to the low temperature reactor.

When operating in accordance with the procedures described immediately above, the final alkylate obtained comprises a mixture of ethylene alkylate and alkylation products of the higher olefins, in the ratio in which the olefins were present in the charge mixture. In order to be able to vary the proportion of ethylene alkylate in the final fuel blends, it is desirable to effect the low temperature selective alkylation and the high temperature ethylene alkylation separately, recovering the alkylate from each stage, even when employing the same catalyst and the same isoparaffin in the two stages.

When the same catalyst is used for the low temperature selective alkylation and for the high temperature alkylation by means of the residual ethylene, the two alkylation processes are advantageously carried out in a counter-current manner. Thus, fresh catalyst may be charged to the ethylene alkylation, and partially spent catalyst from this alkylation may then be charged to the selective alkylation stage of the process. In this manner, the catalyst life for the combined process may be extended substantially over that obtainable when the processes are operated entirely separately.

A preferred modification of the countercurrent combined process is illustrated diagrammatically in the accompanying drawing. As may be seen in this drawing, a charge stock, containing ethylene and propylene, such as stabilizer overhead from the stabilization of cracked naphtha, is compressed and charged directly to the low temperature selective alkylation reactor. The alkylation reaction vessel is about half filled with a catalyst comprising a suspension of aluminum chloride in a liquid complex of aluminum chloride and tertiary butyl chloride. The reactor is suitably equipped with conventional agitating means for securing adequate contact of the hydrocarbon charge and catalyst, and also with conventional cooling means, neither of which are shown in the drawing.

Liquid isobutane is charged to the reactor simultaneously with the olefin charged stock, and a small amount of hydrogen chloride is also continuously charged. The olefin charge stock, isobutane, and hydrogen chloride may be charged separately, as diagrammatically shown in the drawing, or may be suitably pre-mixed to form a single charge mixture. Partially spent catalyst from the high temperature ethylene alkylation step of the process is also charged to the low temperature reactor to maintain the catalyst activity during continuous operation of the selective alkylation.

The reaction mixture in the low temperature alkylation reactor is displaced by incoming charge and catalyst, and passes to a settler, where the heavier catalyst phase separates by gravity. This settler is preferably equipped with cooling means, not shown, in order to maintain substantially the same temperature as that in the alkylation reactor. The hydrocarbon phase which is withdrawn from the upper portion of the settler comprises the propylene alkylate, which is then subjected to caustic washing, stabilization, and debutanization in the usual manner.

The catalyst withdrawn from the bottom of the settler may be passed through a refortifying mixer, in which additional fresh aluminum chloride is incorporated. This will only be necessary, however in case sufficient partially spent catalyst is not available from the high temperature ethylene alkylation to maintain the catalyst activity in the selective alkylation. In most cases, however, no additional aluminum chloride should be required for the selective alkylation. In order to maintain the quantity of catalyst in the low temperature reactor substantially constant, a portion of the catalyst withdrawn from the settler is discarded as spent catalyst. This amount corresponds to the charge of partially spent catalyst, or the amount of fresh aluminum chloride added in the refortifying mixer, or both, as the case may be.

The residual gases from the selective alkylation are suitably collected as overhead from the settler, caustic wash drum, and alkylate stabilizer. These gases comprise propane, ethane, ethylene, and noncondensable gases, corresponding to the original hydrocarbon charge with substantially only propylene removed. These gases are then compressed and charged to the high temperature ethylene alkylation reactor. This reactor is suitably charged with fresh catalyst of the same composition employed in the selective alkylation, and fresh catalyst is charged continuously or intermittently to maintain the catalyst activity. Liquid isobutane and a small amount of hydrogen chloride are charged simultaneously with the ethylene charge stock, and the reaction is effected in a manner similar to the selective alkylation, the only distinction being the use of a higher temperature, for example 110–115° F., and sufficient pressure to maintain a liquid hydrocarbon phase at this temperature.

The reaction mixture which is displaced from the high temperature reactor by incoming charge and catalyst, passes to a settler which is preferably maintained at the same temperature as the reactor. A portion of the catalyst which is withdrawn from the bottom of the settler is charged to the selective alkylation reactor, and the remainder is recycled to the high temperature reactor. The amount of partially spent catalyst withdrawn for use in the selective alkylation corresponds to the amount of fresh catalyst charged to the high temperature reactor.

The hydrocarbon phase removed from the upper portion of the settler constitutes the ethylene alkylate, which is suitably caustic washed, stabilized, and debutanized, as in the case of the propylene alkylate.

The final fractionation of the two alkylates thus obtained may be operated to secure any desired fractions. A suitable separation comprises the simple fractionation illustrated in the drawing, to secure a single overhead aviation motor fuel fraction, and a bottoms fraction suitable for use in automotive fuel blends, or for other purposes. The two overhead fractions may be blended together to obtain a very satisfactory aviation fuel having high anti-knock characteristics and excellent lead response.

Our invention will be further illustrated by the following specific example:

*Example*

An olefin mixture comprising 80% by weight of ethylene and 20% by weight of propylene is utilized for the alkylation of isobutane by the procedure described above and illustrated in the drawing. The low temperature alkylation reactor is approximately half filled with a catalyst comprising 73.5 parts by weight of anhydrous aluminum chloride suspended in a complex prepared by reacting 210 parts by weight of tert.-butyl chloride with 84 parts by weight of anhydrous aluminum chloride. The olefin mixture is then charged to the reactor at a rate of 100 parts by weight per hour, together with 900 parts by weight of isobutane and 1 part by weight of hydrogen chloride per hour, while agitating and maintaining the mixture at a temperature of about 50° F. and under sufficient pressure to provide a liquid hydrocarbon phase. Partially spent catalyst from the high temperature alkylation settler is also charged to the reactor at a rate of about 5 parts by weight per hour. When the reactor becomes filled, the reaction mixture is continuously displaced, by incoming charge and catalyst, to the settler which is maintained at substantially the same temperature and pressure as the reactor.

The catalyst is withdrawn from the bottom of the settler and an amount corresponding to the charge of partially spent catalyst from the high temperature reactor is discarded. The remainder is recycled to the low temperature reactor.

The propylene alkylate is removed from the upper portion of the settler and is caustic washed, stabilized and debutanized in accordance with standard procedures. This alkylate is then fractionated to obtain a 311° F. E. P. aviation motor fuel fraction.

The gas obtained as overhead from the settler, caustic wash vessel, and stabilizer in the low temperature alkylation system comprises essentially unreacted ethylene. This gas is compressed and charged to the high temperature alkylation vessel at a rate of approximately 80 parts by weight per hour, together with 720 parts by weight of liquid isobutane and 1 part by weight of hydrogen chloride.

Initially, the reactor is approximately half filled with the same catalyst used in the low temperature reactor, consisting of 59 parts by weight of anhydrous aluminum chloride suspended in a complex prepared by reacting 168 parts by weight of tert.-butyl chloride with 67 parts by weight of anhydrous aluminum chloride. During continuous operation, fresh catalyst of the same composition is charged to the reactor at a rate of 5 parts by weight per hour, and an equivalent amount of partially spent recycle catalyst is withdrawn for use in the low temperature alkylation reactor.

The reaction mixture in the high temperature alkylation reactor is continuously agitated and maintained at a temperature of about 110–115° F., and under sufficient pressure to provide a liquid hydrocarbon phase. The settler is maintained under substantially the same temperature and pressure conditions as the reactor.

The ethylene alkylate obtained in the high temperature alkylation is subjected to the same finishing operations used for the propylene alkylate, and is fractionated to obtain a 311° F. E. P. aviation motor fuel fraction.

When operating continuously as described above, the yield of propylene alkylate should average at least 185%, based on the weight of the propylene in the charge stock, and may be as high as 210% or even higher. The CFRM octane number of the 311° F. aviation fraction should average at least 84 and may be as high as 87, or higher. The yield of the ethylene alkylate should average at least 280%, based on the weight of the ethylene in the charge stock, and may be as high as 295%, or even higher. The CFRM octane number of the 311° F. aviation fraction should average as high as 90 and may be as high as 93, or higher.

At the hydrocarbon charge rate and fresh catalyst charge rate specified above, yields of debutanized propylene and ethylene alkylates of 185% and 280%, respectively, correspond to a consumption of approximately 0.045 lb. of aluminum chloride per gallon of over-all debutanized alkylate. On the other hand, when alkylating isobutane simultaneously with propylene and ethylene, using the same charge stock as that of the above example, it has been found to be necessary to employ the general conditions specified for the high temperature alkylation of the example, but a higher charge rate for the fresh aluminum chloride, corresponding to a consumption of approximately 0.107 lb. per gallon of total debutanized alkylate obtained. It is thus seen that an improvement in catalyst life of more than 100% may be obtained by the use of our selective alkylation process.

It should be understood, of course, that the above example is merely illustrative and does not limit the scope of our invention. The procedure employed in the selective alkylation step of this example may be modified in numerous respects, in accordance with the foregoing description. For example, a charge stock containing butylenes in addition to ethylene and propylene could be employed, in which case both the propylene and butylenes would be utilized in the low temperature alkylation stage of the process. Similarly, the ethylene alkylation stage of the process may be effected in numerous ways other than that of this particular example. Other ethylene alkylation catalysts such as hydrofluoric acid-boron trifluoride complexes may be used, and other paraffin hydrocarbons or hydrocarbon mixtures may be alkylated by the residual ethylene in this stage of our process. In general, it may be said that the use of any equivalents or modifications of procedure which would naturally occur to those

We claim:

1. In a continuous process for the alkylation of isobutane with olefinic components of a normally gaseous hydrocarbon charge stock containing olefins consisting essentially of propylene and ethylene, the steps which comprise contacting said charge stock in a reaction zone with liquid isobutane in a molar amount substantially in excess of the olefin content of said charge stock in the presence of a partially spent alkylation catalyst comprising a suspension of aluminum chloride in a liquid aluminum chloride-hydrocarbon complex under conditions including a temperature of 30-70° F., and an amount of hydrogen chloride promoter of from 0.1 to 1.0 part by weight added per hour per 100 parts of the aluminum chloride present in said reaction zone, whereby isobutane is selectively alkylated with propylene without substantial alkylation of isobutane with ethylene, separating catalyst and hydrocarbon phases from the resulting reaction mixture, separating from the hydrocarbon phase normally liquid alkylation products and a normally gaseous fraction comprising unreacted ethylene from which propylene has been substantially removed, subjecting said normally gaseous fraction to contact in a second reaction zone with a molar excess of liquid isobutane in the presence of an alkylation catalyst comprising a suspension of aluminum chloride in a liquid aluminum chloride-hydrocarbon complex at a temperature of 110-130° F., separating the resulting reaction mixture into a partially spent catalyst phase and a hydrocarbon phase, recovering an ethylene alkylate from the hydrocarbon phase, and passing at least a portion of the partially spent catalyst phase to the said first mentioned reaction zone to supply the catalyst therein.

2. A cyclic process for producing separate propylene and ethylene alkylates from a $C_2$–$C_3$ hydrocarbon fraction containing substantial amounts of both propylene and ethylene by the use of an aluminum chloride-hydrocarbon complex catalyst while obtaining high catalyst life, which comprises subjecting said $C_2$–$C_3$ hydrocarbon fraction to contact in a reaction zone with isobutane in liquid phase and in substantial molar excess of the olefins present therein, and a partially spent aluminum chloride-hydrocarbon liquid complex containing added aluminum chloride produced in a subsequent step of the cyclic process as hereinafter described, under conditions including a temperature of 30-70° F. and the presence of an added hydrogen chloride promoter in an amount from 0.1 to 1.0 part by weight per hour for 100 parts of aluminum chloride present in said reaction zone to thereby maintain less than 0.1% by weight of HCl on the weight of the aluminum chloride therein, whereby isobutane is selectively alkylated with said propylene without substantial alkylation of isobutane with said ethylene, separately recovering from the reaction products a propylene alkylate and a $C_2$–$C_3$ hydrocarbon fraction enriched in ethylene from which the propylene has been substantially removed, passing said recovered $C_2$–$C_3$ hydrocarbon fraction to a second reaction zone and contacting it therein with isobutane in liquid phase and in substantial molar excess of the ethylene present therein, and a fresh aluminum chloride-hydrocarbon liquid complex containing added aluminum chloride, under conditions including a temperature of 110-130° F. to effect alkylation of isobutane with said ethylene, separating said reaction products into a hydrocarbon phase and a catalyst phase, recovering an ethylene alkylate from said hydrocarbon phase, and passing at least a portion of said catalyst phase to said first reaction zone to supply the aforementioned partially spent catalyst therein.

3. In the alkylation of ethylene and its normally gaseous homologues in the presence of a catalyst consisting of a mobile liquid comprising the reaction product formed by contacting aluminum chloride and a promoter with ethylene and an isoparaffin, the improvement which comprises alkylating isobutane with ethylene in the presence of the freshly prepared catalyst in a first step until the catalyst becomes at least partially spent and then alkylating an isoparaffin with a normally gaseous higher homologue of ethylene in a second step with the catalyst that has become at least partially spent in the first step.

4. In the alkylation of ethylene and its normally gaseous homologues in the presence of a catalyst consisting of a mobile liquid comprising the reaction product formed by contacting aluminum chloride with ethylene and a low-boiling isoparaffin, the improvement which comprises alkylating the low boiling isoparaffin with ethylene in the presence of the freshly prepared catalyst in a first step, and then alkylating a low boiling isoparaffin with a normally gaseous higher homologue of ethylene in a second step with complex liquid catalyst from the first step and which has become at least partially spent in the first step.

5. In the alkylation of low boiling isoparaffins with ethylene and its normally gaseous homologues in the presence of an aluminum chloride-hydrocarbon complex liquid catalyst, the improvement which comprises alkylating a low boiling isoparaffin with ethylene in one step in the presence of freshly prepared aluminum chloride-hydrocarbon complex liquid catalyst and free aluminum chloride, and then alkylating a low boiling isoparaffin with a normally gaseous higher homologue of ethylene in a second step with liquid complex catalyst from the first step and which has become at least partially spent in said first step and comprises the reaction product formed by contacting the aluminum chloride with ethylene and the low boiling isoparaffin.

6. The method according to claim 5, wherein the low boiling isoparaffin is isobutane, the ethylene alkylation step is carried out at a temperature within the range of about 90-130° F., and the alkylation step for the normally gaseous higher homologue of ethylene is carried out at a temperature below said range but above about 40° F.

7. In the alkylation of ethylene and its normally gaseous homologues in the presence of a catalyst consisting of a mobile liquid comprising the reaction product formed by contacting an aluminum halide with ethylene and a low boiling isoparaffin, the improvement which comprises alkylating the low boiling isoparaffin with ethylene in the presence of the freshly prepared aluminum halide-hydrocarbon complex liquid catalyst in a first step, and then alkylating a low boiling isoparaffin with a normally gaseous higher homologue of ethylene in a second step with the complex liquid catalyst from the first step which has become at least partially spent in said first step and comprises the reaction product formed by contacting the aluminum halide with ethylene and the low boiling isoparaffin.

8. In the alkylation of a normally gaseous hydrocarbon charge stock containing ethylene and propylene in the presence of an aluminum chloride-hydrocarbon complex liquid catalyst, the improvement which comprises reacting the said hydrocarbon charge stock with a low boiling isoparaffin in one step in the presence of a catalyst consisting of a mobile liquid comprising the reaction product formed by contacting aluminum chloride with ethylene and a low boiling isoparaffin and obtained from a subsequent step as hereinafter defined, the alkylation being carried out under conditions including relatively lower temperature such that the low boiling isoparaffin is selectively alkylated with propylene, then reacting residual charge stock from said first step with a low boiling isoparaffin in a second step in the presence of an aluminum chloride-hydrocarbon complex liquid catalyst and free aluminum chloride under conditions including a relatively higher temperature effective to alkylate the low boiling isoparaffin with ethylene, removing complex liquid catalyst from said second step which has become at least partially spent, and supplying said complex liquid catalyst to serve as the above-mentioned catalyst in said first step.

LOUIS A. CLARKE.
ERNEST F. PEVERE.

REFERENCES CITED

The following references are of record in the file of this patent:

UNITED STATES PATENTS

| Number | Name | Date |
|---|---|---|
| 1,994,249 | Ipatieff & Grosse | Mar. 12, 1935 |
| 2,220,090 | Evering | Nov. 5, 1940 |
| 2,273,042 | Ipatieff & Pines | Feb. 17, 1942 |
| 2,273,043 | Ipatieff & Pines | Feb. 17, 1942 |
| 2,298,383 | Ipatieff & Pines | Oct. 13, 1942 |
| 2,308,562 | Marschner | Jan. 19, 1943 |
| 2,312,539 | Frey | Mar. 2, 1943 |
| 2,320,293 | Ostergaard | May 25, 1943 |
| 2,340,600 | Lamb | Feb. 1, 1944 |
| 2,260,990 | Goldsby | Oct. 28, 1941 |
| 2,266,012 | d'Ouville | Dec. 16, 1941 |

FOREIGN PATENTS

| Number | Country | Date |
|---|---|---|
| 104,425 | Australia | June 29, 1938 |
| 530,250 | Great Britain | Dec. 9, 1940 |
| 115,000 | Australia | Apr. 8, 1942 |